(12) United States Patent
Lahr

(10) Patent No.: US 8,425,364 B2
(45) Date of Patent: Apr. 23, 2013

(54) CAM-BASED INFINITELY VARIABLE TRANSMISSION

(76) Inventor: Derek Lahr, Blacksburg, VA (US)

( * ) Notice: Subject to any disclaimer, the term of this patent is extended or adjusted under 35 U.S.C. 154(b) by 376 days.

(21) Appl. No.: 12/802,174

(22) Filed: Jun. 1, 2010

(65) Prior Publication Data

US 2010/0304915 A1 Dec. 2, 2010

Related U.S. Application Data

(63) Continuation-in-part of application No. 11/401,054, filed on Apr. 10, 2006, now abandoned.

(51) Int. Cl.
*F16H 37/02* (2006.01)
(52) U.S. Cl.
USPC .......................................... 475/207; 475/343

(58) Field of Classification Search .................. 475/207, 475/214, 343; 476/47, 55
See application file for complete search history.

(56) References Cited

U.S. PATENT DOCUMENTS

| 4,936,155 A * | 6/1990 | Gogins ........................... 74/117 |
| 6,497,634 B1 * | 12/2002 | Bode et al. ..................... 475/211 |
| 7,878,935 B2 * | 2/2011 | Lahr ............................. 475/185 |
| 2006/0154774 A1 * | 7/2006 | Naude ............................. 475/16 |

* cited by examiner

*Primary Examiner* — Justin Holmes
(74) *Attorney, Agent, or Firm* — James W. Hiney

(57) ABSTRACT

A cam based infinitely variable transmission incorporation a ratcheting drive mechanism with one set of planetary gears and a cam with two followers mounted on a carrier with said gears and adapted to in infinitely variable in output but maintain a uniform output for a given uniform input. The followers are can be shifted in relation to the three dimensional cam by a shifter and clutches are used to handle the relative motion of the gears and follower shafts.

11 Claims, 14 Drawing Sheets

CAM-BASED INFINITELY VARIABLE TRANSMISSION

CROSS-REFERENCE TO RELATED APPLICATIONS

Not Applicable

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

This invention relates to a cam-based infinitely variable transmission which solves the old problem of ratcheting based infinitely and constant variable transmissions which is a non uniform output for a uniform input. This application is a Continuation In Part of Ser. No. 11/401,054, filed Apr. 10, 2006 now abandoned by the same inventor and of the same title.

BACKGROUND OF THE INVENTION

The infinitely variable transmission (IVT) has been around for a long time and continues to the present day. Constantinesco developed such a transmission for an automobile in 1920. Present automobiles have a continuously variable transmission (CVT) which are of the belt or torroidial type. Ratcheting IVTs convert a rotational input to a variable reciprocating motion and then use ratchets to rectify this motion. The transmission ratio is changed by varying the amplitude of the reciprocation motion. Ratcheting infinitely variable transmissions are in use today in many applications. For example, John Deere uses a CVT to regulate feed rates in its Air Seeder. Honda uses a similar ratcheting CVT for its downhill bicycle

DESCRIPTION OF RELATED ART INCLUDING INFORMATION

The prior art in the field of CVTs can be broken down into four separate categories which are as follows:
a. Torroidal type CVTs
b. Belt type CVTs.
c. Ratcheting drive CVTs.
d. Non-uniform output CVTs Group a.

Among the patents disclosing torroidial type CVTs are U.S. Pat. No. 4,885,949 to Barber, U.S. Pat. No. 5,820,510 by Mazda, US publication 2003/0,060,318 to Sumi, U.S. Pat. No. 6,045,477 to Schmidt, U.S. publication 2004/0,142,785 to Inoue and U.S. Pat. No. 6,561,941 to Nissan. Typically the transmissions disclosed in these disclosures have lower efficiencies due to their high bearing loads, auxiliary components, and complex control mechanisms. I.e., all the aforementioned patents, with the exception of Barber, include one or more planetary gear sets to increase the ratio range and torque capacity of the transmission. Additionally, they all use one or more clutching units to selectively control the torque flow between the gear sets and torroidal drives. Both of these added items increase the cost and complexity of the transmission thereby making it less competitive in the marketplace and less reliable. They use additional mechanisms to optimize the transmission for the selected gear ratios and power inputs. For example both Barber and Mazda used different mechanisms to control the axial force exerted on one or more of the torroidal discs to optimize the torque capacity as related to the inputted power.

Group b.

This group includes U.S. Pat. No. 4,665,773 to Mitsubishi which shows a belt type CVT in combination with a planetary gear set. The problem with belt transmissions is that they suffer from high power losses due to friction. The losses come about from both the bearing loads on the pulley and the slippage of the belt itself on the pulley. This belt drive shown uses many sensors to measure input and output speeds and torques which enables the designer to better moderate the amount of axial force on the belt pulleys according to the transmitted torque. This increases efficiency, belt life and torque capacity seen in other belt drives like the cam-based CVTs. Unlike both belt drives and torroidal drives, ratcheting drives like cam-based CVT do not depend on the friction between several rollers or between a belt and a pulley. Transmitting power through these means is inherently inefficient. A number of frictional clutches is used instead which can transmit power with nearly 100% efficiency. The clutches only generate drag when freewheeling which is very small.

Group c

This group includes U.S. Pat. No. 4,909,101 to Terry and presents a ratcheting drive similar to the cam-based CVT drive but which is very different. It uses a number of followers placed on the outside of a variable eccentricity device to facilitate an increase in rotational velocity between the input and the output. This transmission has its eccentricity limited to the offset of a circular cam with respect to the central axis of the transmission. This feature limits the control the designer has on the functionality of the transmission. For example, if the followers are shaped to produce a uniform output the transmission cannot produce any other waveform as an output. The torque capacity of this design is also limited due to the large forces impinging on the followers. This is due to the feature which allows for the effective length of the follower decreasing as the eccentricity increases resulting in the contact stress at the contact point increasing. If this stress gets too high the transmission can fail.

Group d

Somewhat similar to group c is the grouping exemplified by U.S. Pat. No. 6,371,881 to Benitez. Unlike the patent to Terry in Group c this particular transmission is characterized by its non-uniform output for a uniform input. The operation is similar to Terry in that there is a device which can vary the amount of rotation of several planetary gears with respect to the carrier. This design uses a slotted plate with varying eccentricity. Clutches are then used to transmit power from the gear with the greatest rotational velocity. The mechanism shown in U.S. disclosure 2003/0,221,892 is similar in concept but differs in implementation. It uses several reciprocating four bar linkages to oscillate several one way clutches which then produce a rotational output. Like Benitez though, it also exhibits a non uniform output for a given input.

BRIEF SUMMARY OF THE INVENTION

While all these existing CVTs and IVTs using ratcheting drives exist and have existed for some time they exhibit a non-uniform output given a uniform input. The instant invention solves this dilemma by employing a cam based IVT which has a controllable output waveform which gives it the ability to produce a uniform output. The instant invention uses a cam with a shifter and follower to interact with planet gears transfer the input into a uniform output. Instead of two sets of planetary gears as most IVTs use a cam and follower mechanism is substituted for the sun gear and planetary gears to provide a uniform output. This results in the sum of the forces on the follower being equal to zero. The torque on the carrier is smaller than the input torque and by conservation of energy the rotation of the carrier must be faster that the sun gear.

The cam-based CVT is advantageous in several ways when compared to the background transmissions. Like other ratcheting drives, it exhibits higher efficiency than either torroidal or belt drives due to the nature of its power transmissions. In addition, it does not need a complex control system for operation like these drives. It can also be designed to produce a uniform output given a uniform input like the device of Terry. But unlike any of the background transmissions with ratcheting drives, its output can be matched to nearly any periodic waveform in addition to being constant. In applications with a variable power input, such as a human pedaling a bicycle, this waveform shaping can be very advantageous, increasing the overall efficient of the system.

OBJECTS OF THE INVENTION

Accordingly, it is an object of this invention to provide an improved infinitely variable transmission for various uses, and It is a further object of this invention to provide an improved infinitely variable transmission with a ratcheting drive, and It is yet another object of this invention to provide an improved ratcheting variable transmission without the need of a complex control system, and It is still another object of this invention to provide an improved ratcheting Infinitely variable transmission that can produce a uniform output given a uniform input and which output can be matched to nearly any periodic waveform in addition to being constant, and These and other objects of the invention will become apparent when reference is had to the accompanying drawings in which.

DETAILED DESCRIPTION OF THE INVENTION

A continuously variable transmission (CVT) is a system which allows a user to vary the speed between an input and output progressively from one positive value to another. Unlike conventional transmissions, the selection of gears is not restricted to a finite number of ratios. Infinitely variable transmissions (IVTs) are CVTs which also have a transmission ration of zero. Presented here is a novel, highly configurable, ratcheting CVT/IVT based on the operation of a planetary gearset. It is unique in both its operation and its possible applications because it combines the flexibility of a planetary gearset and a CVT into one package. Unlike other ratcheting CVTs which produce a non uniform output for a uniform input, the instant invention can shape the output to match many periodic waveforms. Consequently, this ratcheting drive has the unique ability to produce a uniform and continuous output.

The instant invention has many applications. CVTs currently improve the performance and fuel economy of many automobiles. They are also used in industrial drive applications where varying speeds are needed. Bicycles can benefit from an efficient and enclosed continuously variable transmission. This is seen in the trend towards gearbox equipped mountain bikes.

Figure 1A:
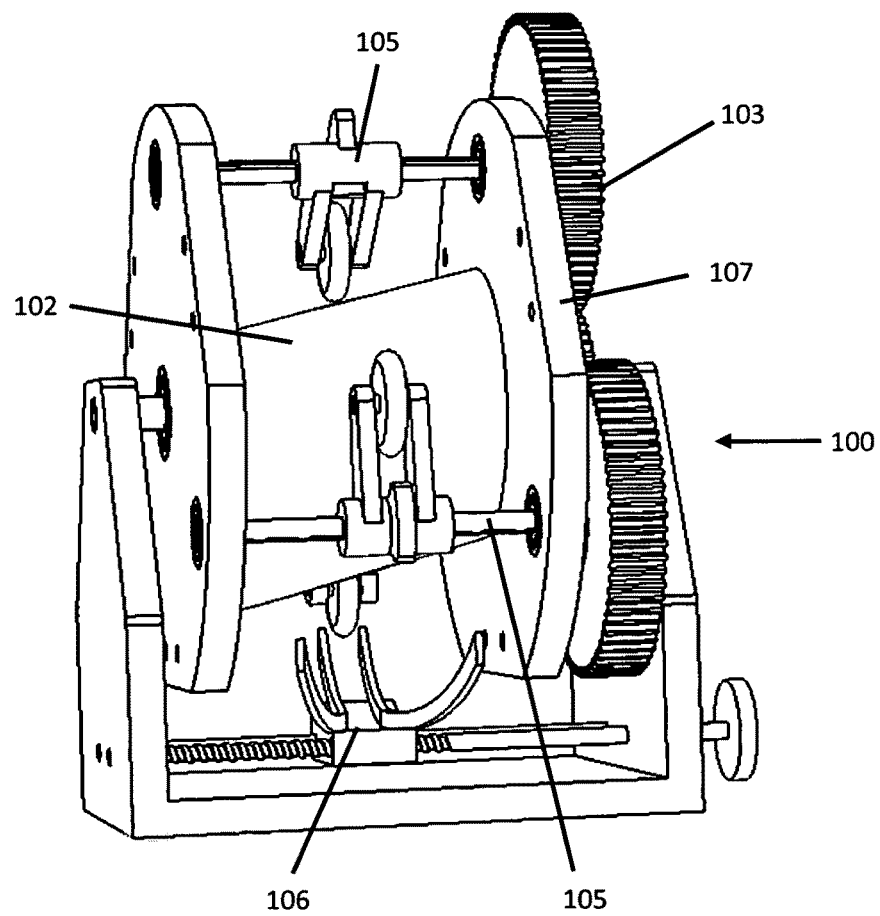
FIGS. 1a and 1b are isometric views of the transmission.
Figure 1B:
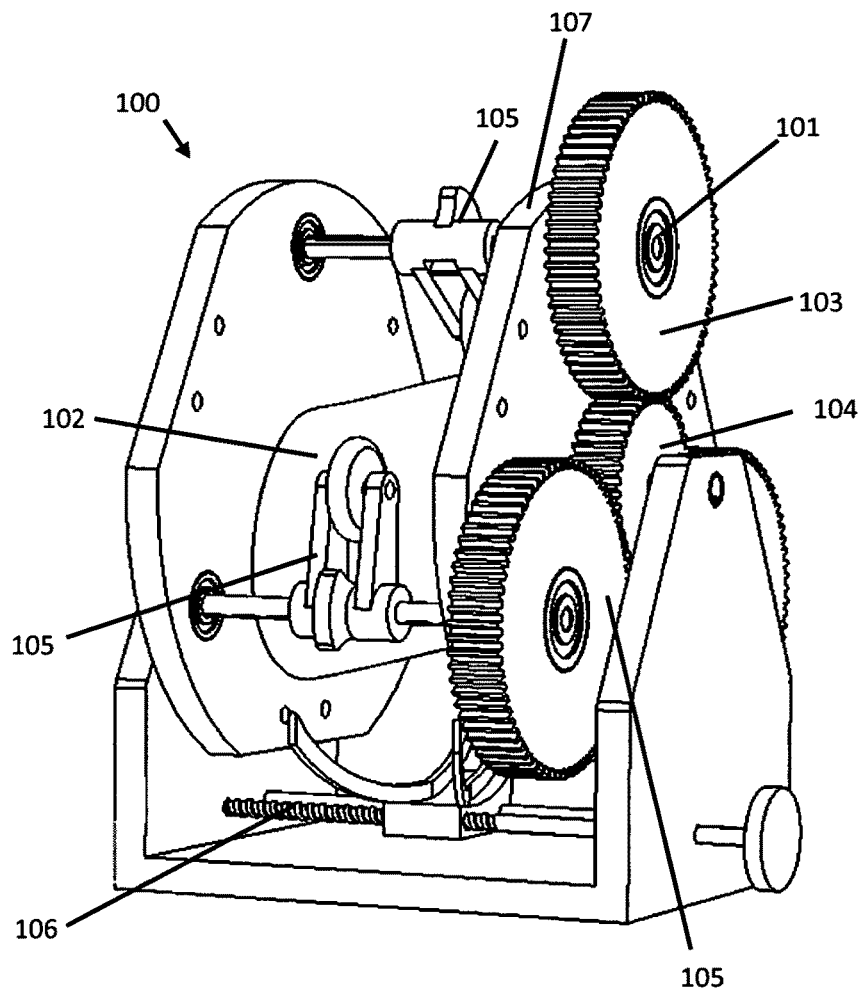
Figure 1C:
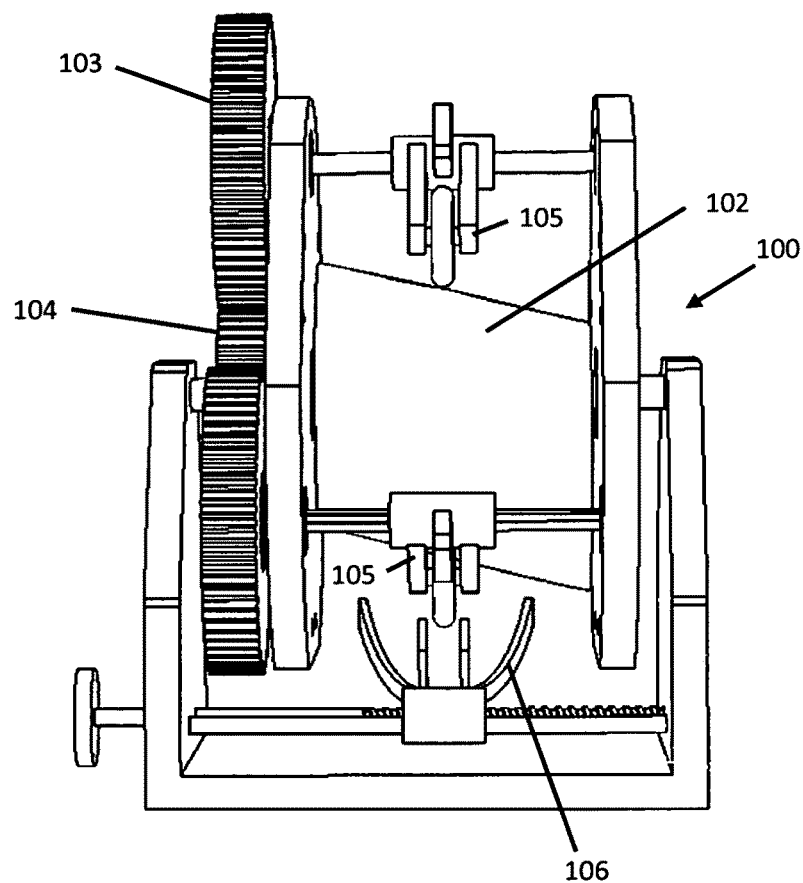
FIG. 1c is a front view of the transmission shown in FIGS. 1a and 1c.

The operation of the instant transmission is based on a planatery gearset with two sun gears, a planet carrier, and a number of planet gears. In the transmission, the function of one sun gear and its planets is replaced with a centrally located cam, oscillating cam followers and indexing clutches. The three dimensional cam is an infinite series of profiles blended together and is located along the rotational axis of the planet carrier. The cam followers are keyed to the planet axles which are carried by the planet carrier. On the end of these axles are the indexing clutches which connect to the remaining planetary gears. The transmission is shown as 100 in FIGS. 1a, 1b and 1c. The clutches 101 are shown mounted on the ends of the axles. Cam 102 is shown with one set of planetary gears 103 mounted thereon with sun gear 104, which is the input gear, engaged therewith. A follower 105 rides on cam 102 and the output is carrier 107.

Figure 2A:
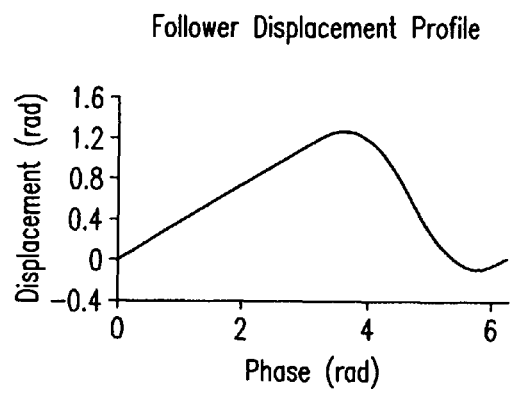
FIGS. 2a and 2b are two graphs showing follower displacement and velocity.
Figure 2B:
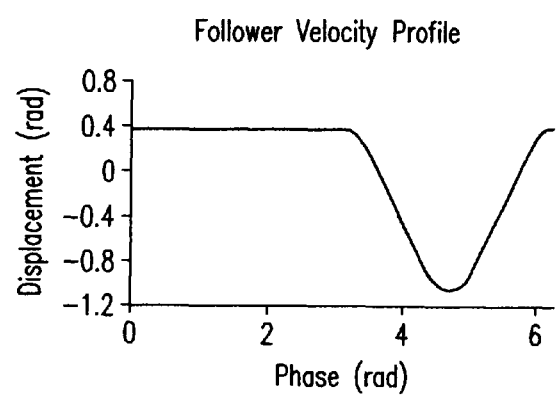
Figure 3:
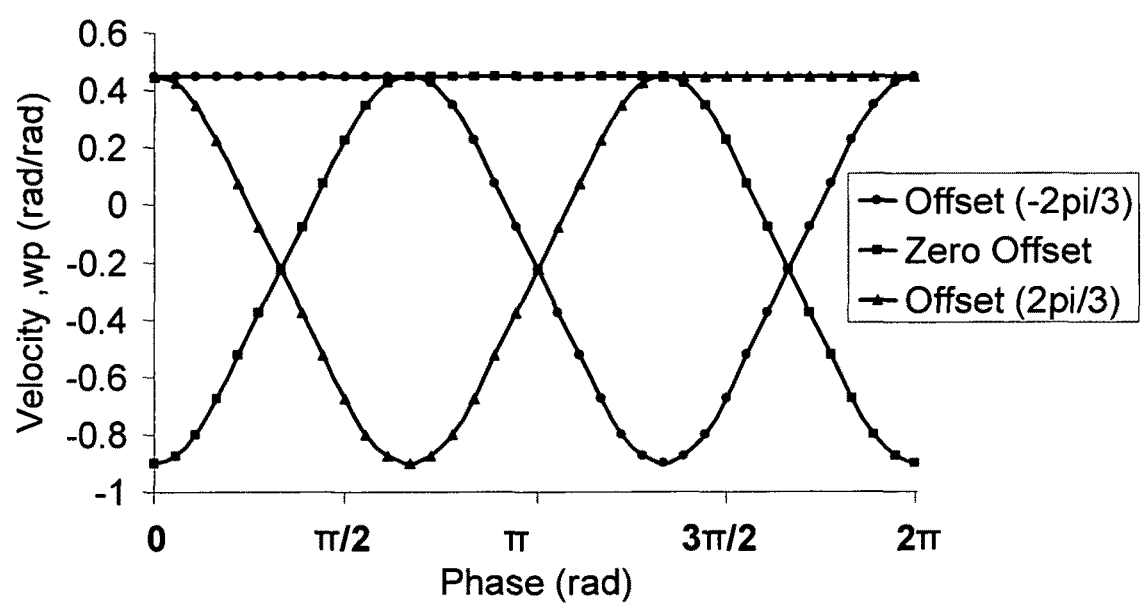
FIG. 3 is a velocity overlay showing the transfer of power between followers.

Referring to FIGS. 2a and 2b there is shown charts for the follower 105 displacement profile and velocity profile. The acting planet is the planet gear with the maximum rotational velocity at any time and is the gear that is driving the output. The portion of the cam profile on which a follower, and therefore planet gear, has the maximum velocity is called the acting profile. The lift of the follower during the acting profile of the cam is given by:

$$\Theta_l = \frac{\pm \int_0^{2\pi} \max(w_{p1}(\Theta), w_{p2}(\Theta), \ldots, w_{pn}(\Theta)) d\Theta}{n}, \quad (1)$$

Where ωp is the velocity of the planet gear. This is illustrated in FIG. 3 which shows n velocity profiles overlaid with and offset of 2π/n. In this example n equals three for a transmission with three followers. The sign of Θ1 is positive if the follower rotates in the same direction of the cam as it rotates and is negative if they rotate in opposite directions. When the follower velocity is constant for the acting profile, Equation 1 simplifies to:

$$\Theta_l = \pm \max(\omega_p(\Theta)) \frac{2\pi}{n}. \qquad (2)$$

A kinematic relationship can be established for any velocity profile, but this design assumes a constant velocity output. Similar to the kinematic relationships of a planetary geartrain, the motion of all of the elements must satisfy the relationships:

$$\Theta_3 = \Theta_2\left(1 - \frac{\Theta_l n r_p}{2\pi r_3}\right) + \Theta_1 \frac{\Theta_l n r_p}{2\pi r_3}. \qquad (3)$$

Differentiating Equation 3 yields:

$$\omega_3 = \omega_2\left(1 - \frac{\Theta_l n r_p}{2\pi r_3}\right) + \omega_1 \frac{\Theta_l n r_p}{2\pi r_3}. \qquad (4)$$

Equation 4 can be used for any iteration of the transmission where the corresponding velocity of the stationary component is set to zero.

A unique feature of this design is the way the indexing clutches limit the transmission ratio values for iterations in which the carrier is rotating. For these designs, $\Theta_1$ must be chosen such that the planet gear 103 rotates opposite the direction of the applied torque from the sun gear 104. This feature ensures the correct operation of the indexing clutches.

The goals of the instant inventive effort were to design a transmission with a gear ratio from one to four, a torque capability of 25 ft.lb, and a volume less than a cubic foot. Several iterations with different input and output components were scrutinized as potential designs. They were compared with the maximum input torque to the follower torque. The results of this effort is seen in Table 1. Iteration 1 was the best compromise between torque capacity and simplicity and was chosen for the design process.

TABLE 1

Input torque to follower torque relationship for various iterations.

| Iteration | Input | Output | $T_p/T_{input}$ |
|---|---|---|---|
| 1 | Sun | Carrier | =1.67 |
| 2 | Carrier | Sun | =6 |
| 3 | Cam | Carrier | >0 (=1.5) |
| 4 | Cam | Sun | >0 (=4) |

Iteration 3 and 4 use a geared input and corresponding transmission ratios necessary to meet the requirements.
The torque ratios for these iterations can be varied with the input gear ratio. A nominal value is given in parenthesis.

The cam profile was designed using a trapezoid acceleration curve. The velocity and position equations in Table 2 were found by integrating the acceleration curve. The level of acceleration needed to return the follower to its origin after the acting profile is a function of cop and n. The equations from Table 2 were programmed into Microsoft Excel® and the acceleration was found using the "Goal Seek" function such that $\Theta p,6$ equals $\Theta p,0$.

A rotational input causes the planet carrier to rotate in relation to the cam. This causes the followers to oscillate on their axis as they move about the cam. One directional component of this oscillating motion passes through the indexing clutches and is transferred to the sun gear. Thus the rotation of the sun gear is advanced or retarded in relation to the planet carrier.

The infinite series of profiles that make up the cam allow for an infinite number of transmission ratios to be selected between two values. By varying the position of the cam followers in relation to the cam, the particular profile they follow can be changed. This affects the magnitude of the follower's oscillation and therefore the output of the transmission. Shifting is accomplished using a set of rails designed to guide the followers.

Like a planetary gearset, the input and output of this transmission can be varied between the cam, carrier or sun gear. The unique characteristics of each iteration can be matched to the particular application. For example, several iterations are continuously variable while others are infinitely variable. In addition, this transmission can be designed as a differential device with either two inputs or two outputs.

What follows is a kinematic analysis of the cam-based IVT.
Nomenclature:
$\alpha$, pressure angle of cam;
n, number of followers;
$r_3$, sun gear radius;
$R_c$, carrier radius;
$R_f$, follower radius;
$r_p$, planet gear radius;
$R_r$, follower roller radius;
$\Theta$, dependent variable in the follower motion profiles;
$\Theta_1$, angular position of the cam;
$\Theta_2$, angular position of the carrier;
$\Theta_3$, angular position of the sun gear;
$\Theta_l$, magnitude of follower lift during acting profile;
$\Theta_p$, angular position of the follower and planet gear;
$T_3$, applied torque to sun gear;
$\omega_1$ angular velocity of the cam;
$\omega_2$, angular velocity of the carrier;
$\omega_3$, angular velocity of the sun gear;
$\omega_p$, angular velocity of the followers and planet gears;

The behavior of the transmission is completely dependent on the cam profile. In this section, the behavior of the transmission is described in terms of an arbitrary profile, as seen in FIGS. 2a and 2b. Several variables can be assigned which will help define the behavior of the transmission.

TABLE 2

Acceleration, Velocity, and Position functions.

| Phase | $\Theta'=$ | n | Acceleration, $A=$ | Velocity, $\omega_n=$ | Position, $\Theta_{p,n}=$ |
|---|---|---|---|---|---|
| $[0, 2\pi/3]$ | $[0, 2\pi/3]$ | 1 | 0 | $\omega_p$ | $\omega_p * \Theta' + \Theta_{p,0}$ |

TABLE 2-continued

Acceleration, Velocity, and Position functions.

| Phase | $\Theta'=$ | n | Acceleration, A= | Velocity, $\omega_n=$ | Position, $\Theta_{p,n}=$ |
|---|---|---|---|---|---|
| $[2\pi/3, 5\pi/6)$ | $[0, \pi/6)$ | 2 | $\dfrac{-\alpha(\Theta')}{\pi/6}$ | $\dfrac{-\alpha(\Theta')^2}{\pi/3} + \omega_{n-1}$ | $\dfrac{-\alpha(\Theta')^3}{\pi} + \omega_{n-1}\Theta' + \Theta_{p,n-1}$ |
| $[5\pi/6, 7\pi/6)$ | $[0, \pi/3)$ | 3 | $-\alpha$ | $\alpha\Theta' + \omega_{n-1}$ | $\dfrac{\alpha(\Theta')^2}{2} + \omega_{n-1}\Theta' + \Theta_{p,n-1}$ |
| $[7\pi/6, 3\pi/2)$ | $[0, \pi/3)$ | 4 | $\dfrac{\alpha(\Theta')}{\pi/6} - \alpha$ | $\dfrac{\alpha(\Theta')^2}{\pi/3} - \alpha\Theta' + \omega_{n-1}$ | $\dfrac{\alpha(\Theta')^3}{\pi} - \dfrac{\alpha(\Theta')2}{\pi/3} + \omega_{n-1}\Theta' + \Theta_{p,n-1}$ |
| $[3\pi/2, 11\pi/6)$ | $[0, \pi/3)$ | 5 | $\alpha$ | $\alpha\Theta' + \omega_{n-1}$ | $\dfrac{\alpha(\Theta')^2}{2} + \omega_{n-1}\Theta' + \Theta_{p,n-1}$ |
| $[11\pi/2, 2\pi)$ | $[0, \pi/6)$ | 6 | $-\dfrac{\alpha(\Theta')}{\pi/6} + \alpha$ | $\dfrac{-\alpha(\Theta')^2}{\pi/3} + \alpha\Theta' + \omega_{n-1}$ | $\dfrac{-\alpha(\Theta')^3}{\pi} - \dfrac{\alpha(\Theta')2}{\pi/3} + \omega_{n-1}\Theta' + \Theta_{p,n-1}$ |

The exact position and velocity of the cam follower can be established from this level of acceleration. These can be seen for $\omega p=0.44$[rad/rad] and n-3 in FIG. 4. FIG. 5 shows the location of all the variables used in the subsequent equations to find the cam profile.

Figure 4:
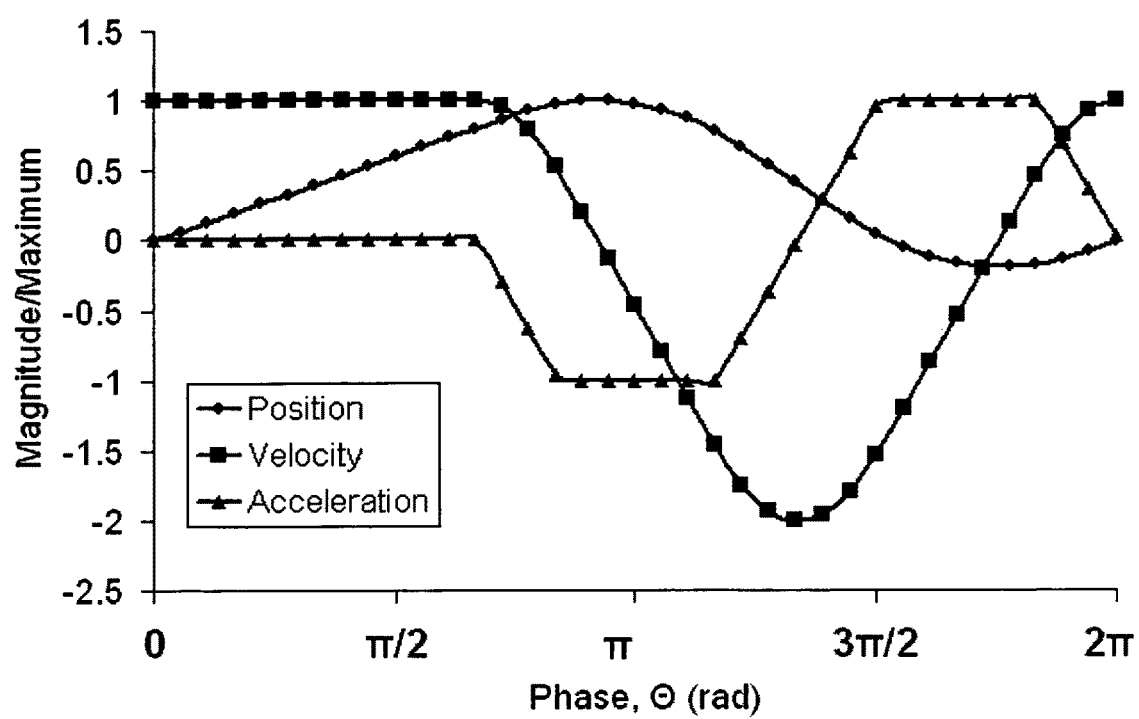
FIG. 4 is a graph showing the follower's acceleration, velocity and position as a function of cam rotation.
Figure 5:
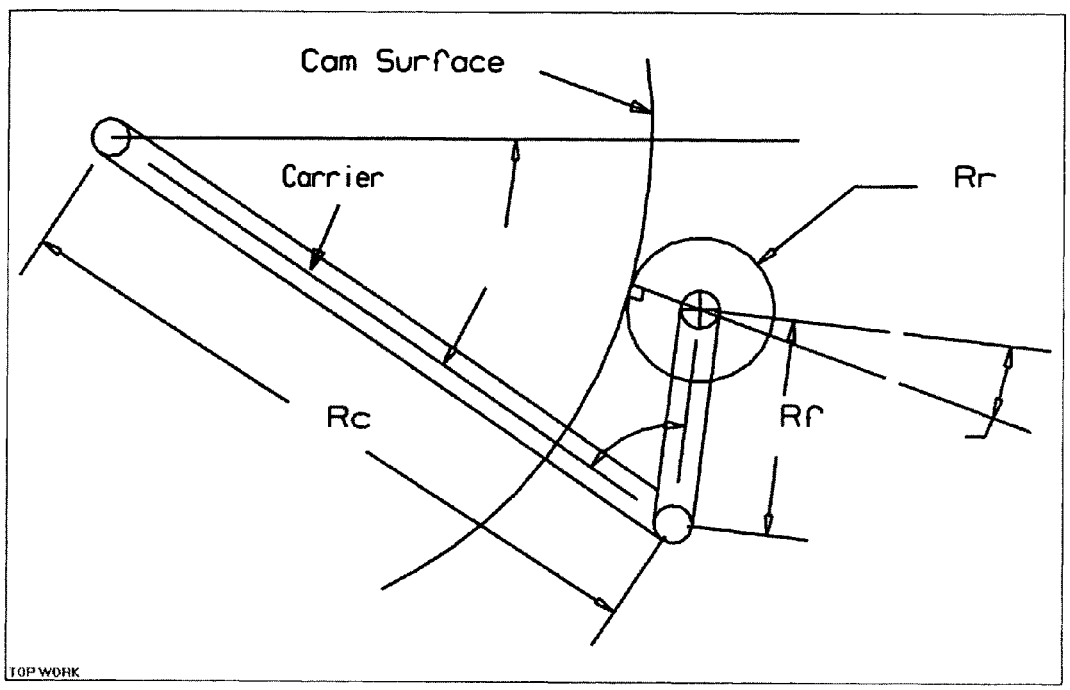
FIG. 5 shows the location of variables with respect to the transmission.

As shown in FIG. 4, the follower's acceleration, velocity and position as a function of cam rotation. The maximum value of position, velocity and acceleration are 63.4°, 0.44 [1/sec], and 0.014[1/sec²], respectively.

With reference to FIG. 5 there is shown the location of the variable with response to the transmission. The position of the pitch curve in the reference system of the cam is given by the equations:

$$x = R_c * \cos(\Theta_2) - R_f \cos(\Theta_2 + \Theta_p) \quad (5)$$

$$y = -R_c * \sin(\Theta_2) + R_f \cos(\Theta_2 + \Theta_p). \quad (6)$$

The position of the cam surface is then given by the equations, $$x_{cam} = x + R_r\left(\dfrac{y'}{w'}\right) \quad (7)$$

$$y_{cam} = y + R_r\left(\dfrac{x'}{w'}\right), \quad (8)$$

where $$x' = -R_c \sin(\Theta_2) + R_f \cos(\Theta_2 + \Theta_p)(1 + w_p); \quad (9)$$

$$y' = -R_c \cos(\Theta_2) - R_f \cos(\Theta_2 + \Theta_p)(1 + w_p); \quad (10)$$

$$w' = \sqrt{x'^2 + y'^2} \text{ [3]}. \quad (11)$$

Figure 6:
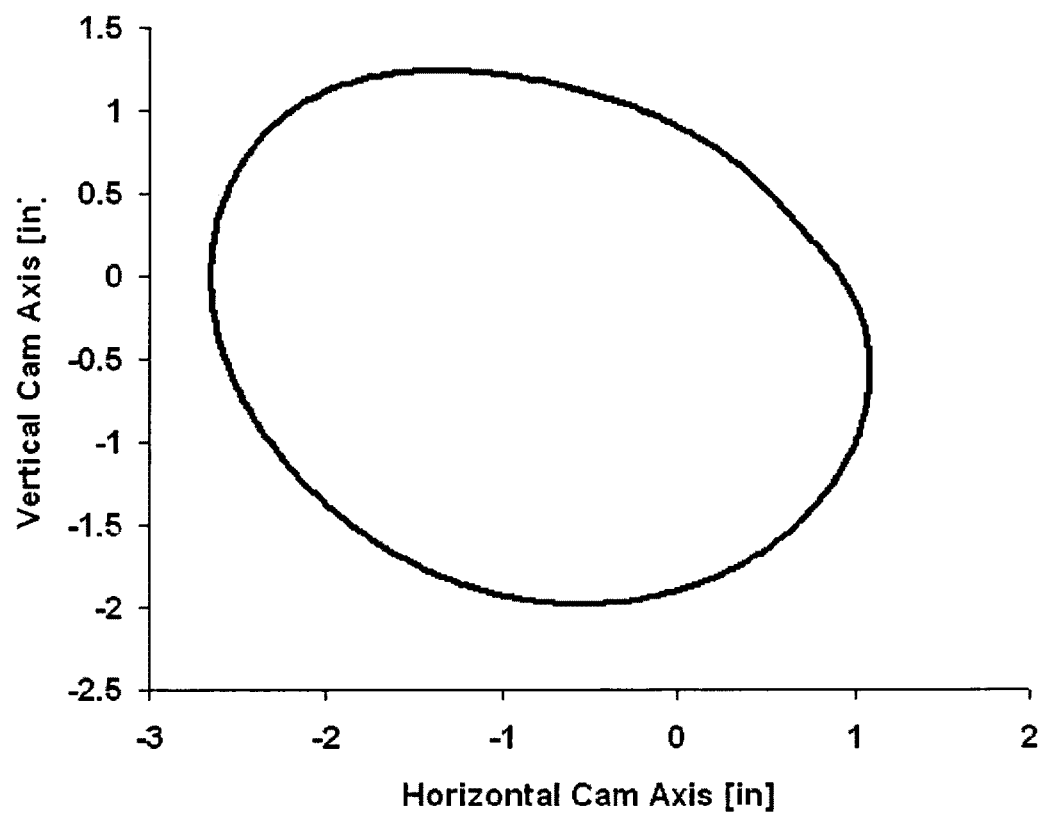
FIG. 6 shows an example of one cam profile.

The resulting cam profile from the curves in FIG. 4 can be seen in FIG. 6 which shows an example of one cam profile. It was generated for an wp of 0.44.

The pressure angle, $\alpha$, is $$\alpha = \cos^{-1}\left(\dfrac{x'\cos(\Theta_p - \Theta_2) + y'\sin(\Theta_p - \Theta_2)}{\sqrt{(x'^2 + y'^2)}}\right) \quad (12)$$

Once $\alpha$ is known, the force normal to the cam is given by $$F_{cam} = \dfrac{T_3 r_p}{r_f r_3 \cos(\alpha)}. \quad (13)$$

Finally, the radius of curvature is estimated for any $\Theta_{2,n}$ by the following equation, $$\dfrac{ds}{d\Theta} = \dfrac{w'(\Theta_{2,n+1} - \Theta_{2,n})}{(\tan^{-1}(y'_{n+1}/x'_{n+1}) - \tan^{-1}(y'_n/x'_n))}. \quad (14)$$

The radius of the roller was chosen to be half of the minimum radius of curvature to ensure the proper motion of the follower and avoid undercutting. The contact stress was calculated because it is the limiting stress in the transmission. It was computed using the Hertzian contact stress equations for two spherical elements using the radius of curvature of the cam and the roller follower. Review showed that increasing rf, rc and n will decrease the contact stress but increase the size and weight of the transmission. In addition, increasing rf will also necessitate a smaller roller, which will eventually put an upper limit on rf.

The meet the design specification, an iterative process was used with the Excel program to optimize the design. The first iteration began with n equaling two, for which the size requirement could not be met without exceeding the elastic limit of the cam material, nylon. Increasing n to three reduced the size of the transmission and the maximum contact stress. The final values for all necessary parameters are summarized in Table 3.

TABLE 3

The final design parameters.

| Parameter | Value |
|---|---|
| n | 3 |
| $R_c$ | 4 [in] |
| $R_f$ | 2.25 [in] |
| $R_r$ | 0.75 [in] |
| $R_p/R_s$ | 1.67 |
| Max($\omega_p$) | 0.45 |
| Min($\omega_p$) | 0 |

These parameters were incorporated into the transmission as shown in FIG. 1. The cam is molded as a splined surface through eight profiles corresponding to eight different follower velocities. The resulting transmission has a ratio range of one to four, has a maximum shear stress in the cam with a factor of safety of two and is less than a cubic foot in size.

Figure 7:
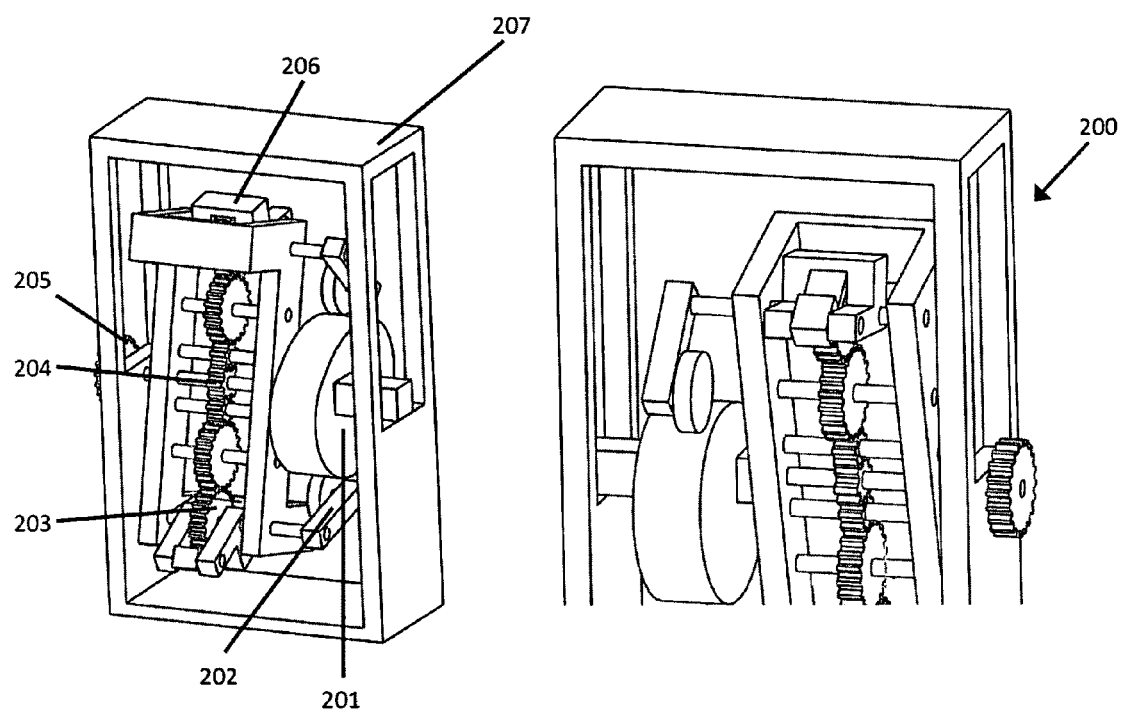
FIG. 7 shows a isometric view of one embodiment of the invention.
Figure 8:
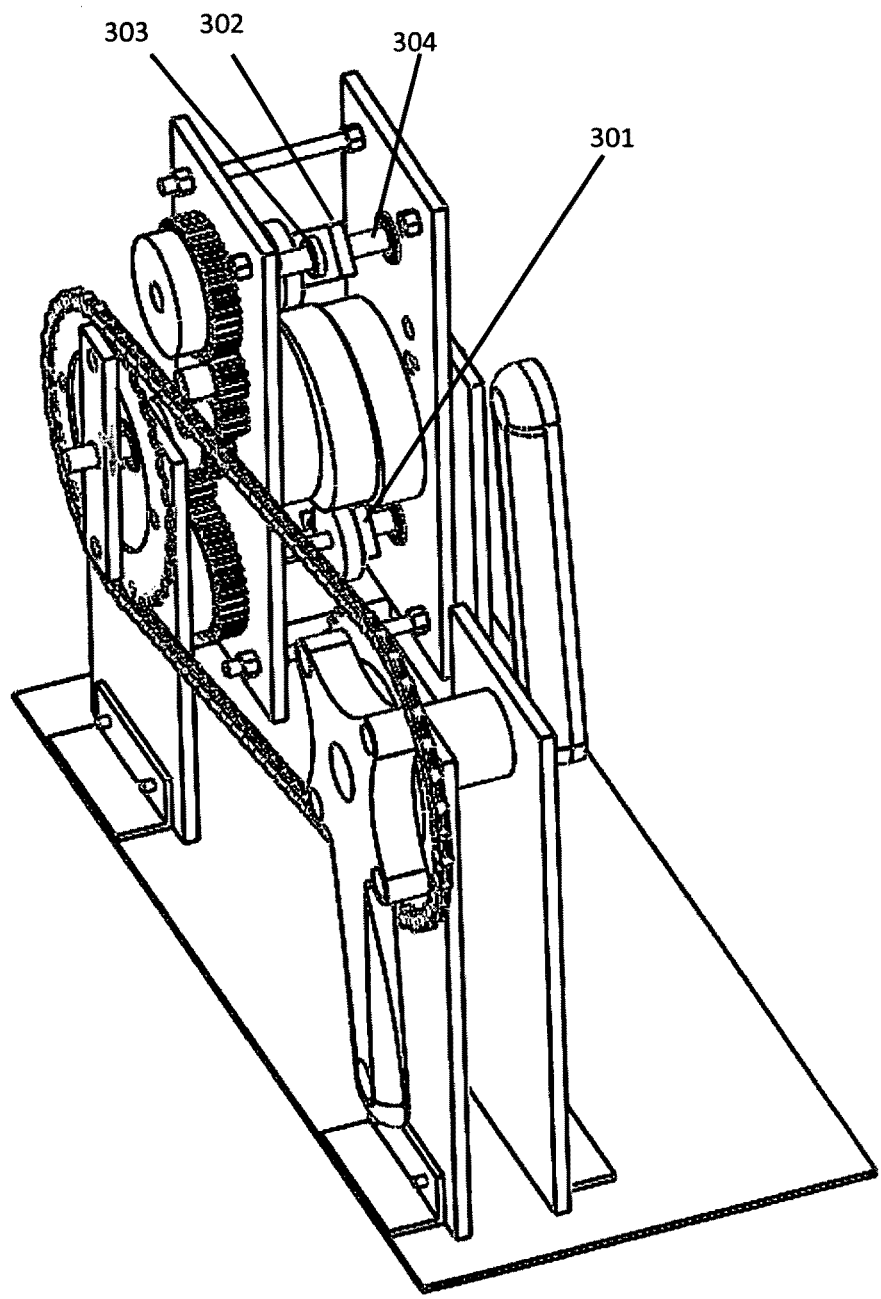
FIGS. 8 through 11 show photographs of a second embodiment of the invention
Figure 9:
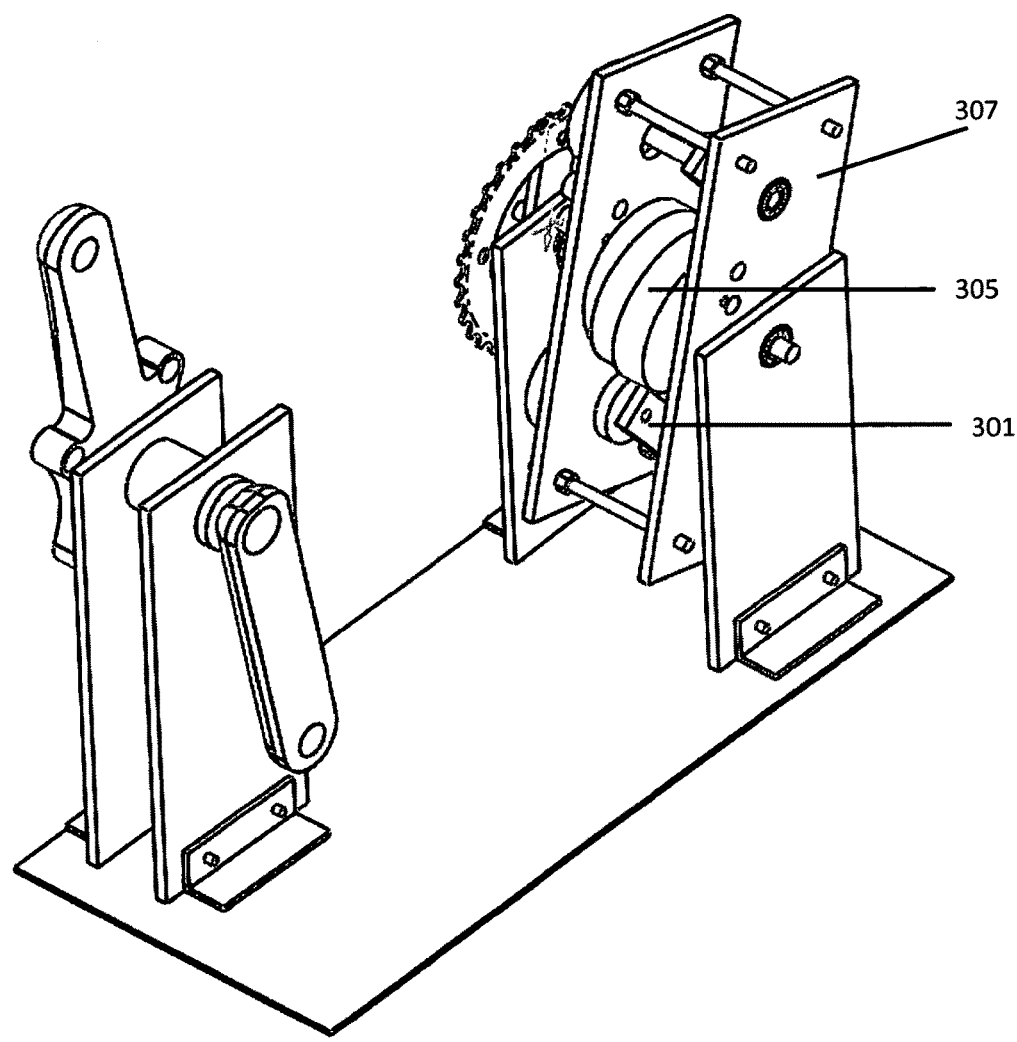
Figure 10:
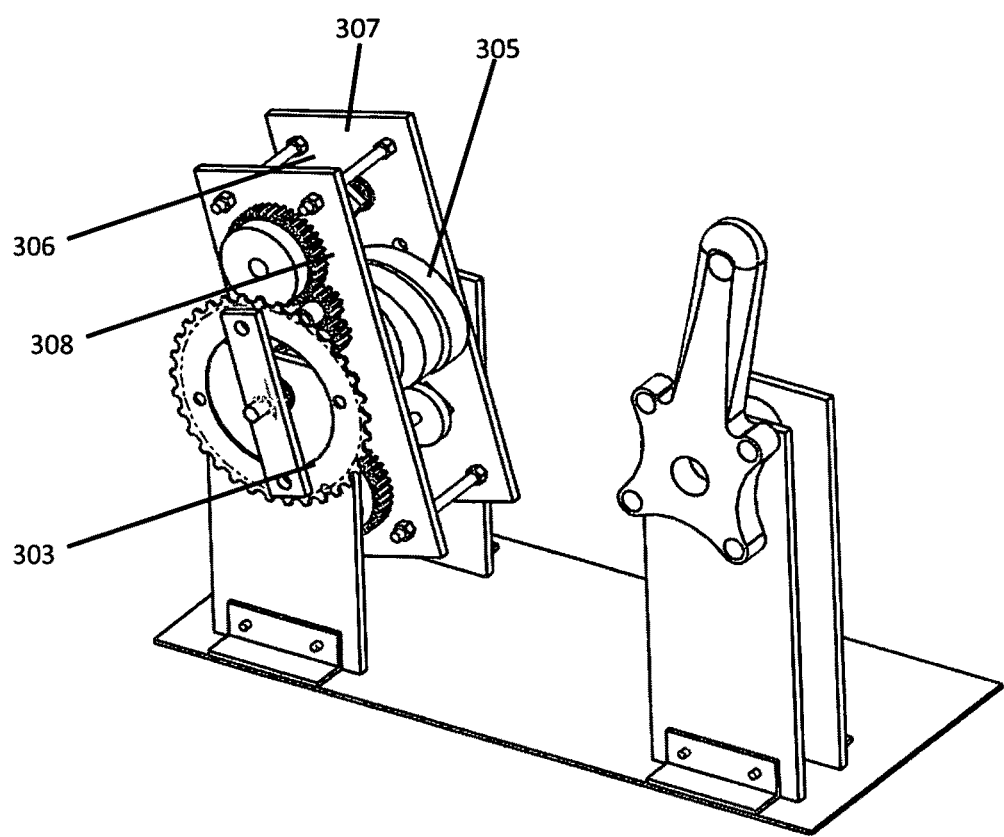
Figure 11:
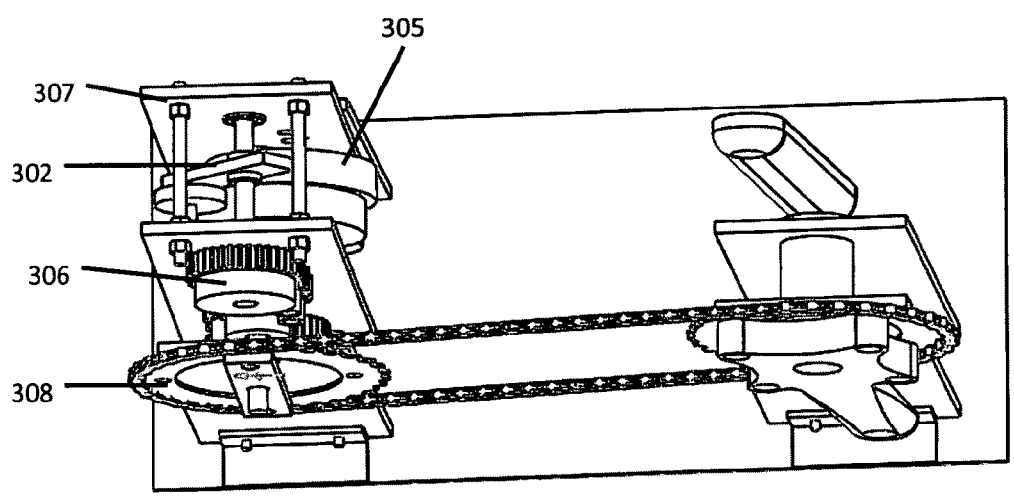

Referring now to FIG. 7 there is shown an operational prototype constructed using Lego Technic® brand toy blocks. It was designed such that the sun is the input, the carrier is the output and the cam is stationary. This cam represents only one profile of the 3D cam which would be used in a CVT. Therefore, the model only has a transmission ratio of 3/2. The profile was constructed in NX3 using a spline though the points generated from the Excel file. It is generally designated as 200 and has cam 201, follower 202, planet gear 203, sun gear 204, input 205, ratchet 206 and carrier/output 207.

Another prototype was constructed of aluminum, steel and nylon and is shown generally as 300 in FIGS. 8 through 11. Two followers 301 and 302 were used with this model. A Sprag clutch 303 was employed between the follower and the planet gear shaft 304. The cam 305 was composed of three different cam profiles to accomplish three different ratios. Planet gears 306 were mounted on one side and the carrier/output 307 on the other. Input sprocket is shown as 308 on the drawings.

Figure 12:
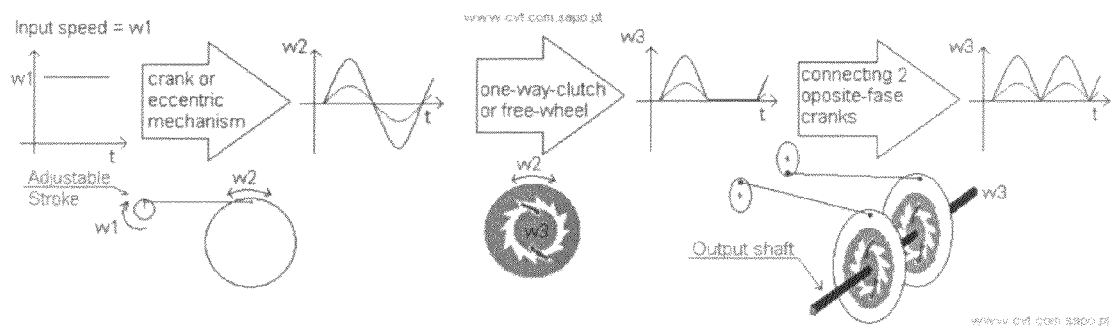
FIG. 12 shows a diagrammatic chart showing how the transmission ratio is changed.

FIG. 12 is a diagrammatic drawing of how the transmission ratio is changed by varying the amplitude of the reciprocation motion.

Discussion of Instant invention Differences from Disclosure of Lee, U.S. Pat. No. 5,944,628

The difference between the instant invention and the device shown in the patent to Lee, U.S. Pat. No. 5,944,628, are many both in structure and how they function. The first planetary gear of Lee (FIG. 1, element 8) does not anticipate the claims of the instant application. In the disclosure of Lee, this planetary gearset is used as a "forward/reverse" controller as stated in Lees specification (Col 2, line 5; and col. 3, lines 21 through 36). The purpose of the forward/reverse controller is to enable the transmission described by Lee to enable the final output of the transmission (FIG. 1, element 92 or congruently FIG. 1, element 96), to rotate in both a forwards and backwards direction. The manner in which this is accomplished is by two clutches (FIG. 1, element 16, and element 14). When the clutch element 14 is engaged, the carrier 24 rotates in the same direction as the input to the planetary gear 6. When clutch 16 is engaged and clutch 14 is disengaged, the output carrier 24 of the planetary gearset rotates in the opposite direction of the input 6.

This invention claims a planetary gearset, but one that does NOT function in the manner similar to Lee's. Firstly, in claim 1 herein, the carrier of the first planetary gearset is the "output of said transmission". Specifically, it is the final output to the transmission, capable of driving auxiliary devices attached to the transmission at continuously variable rotational velocities. This is altogether different from Lee's patent in that the carrier is the output of only the forward reverse controller (FIG. 1, element 8) and not the entire transmission. The output of Lee's transmission is stated as being element 96 of FIG. 1, and described as such in col. 4, lines 49 though 51. The output is driven through the output gear (FIG. 1, element 92) which is described in line 46 of column 4 in Lee's patent. Furthermore, the output carrier of the first planetary gearset of Lee's patent (FIG. 1, element 24) can only rotate at two speeds with respect to the input of the transmission, one being in the forward directions and one in the reverse direction.

The carrier of the first planetary gearset of this invention, FIG. 1, element 107) also only rotates in one direction, as implied by claim 10 herein as well as derived from specification herein. Therefore, the function of the first planetary gearset (FIG. 1, element 8) of Lee's patent is fundamentally different from that described herein in that the planetary gearset of Lee operates in two directions, at only two fixed speeds with respect to the input and does not serve as the final output of the transmission. Conversely, the first planetary gearset of this invention is the final output of the transmission, rotating at continuously variable speeds and operates in only one direction. It is clear then that these two planetary gearsets are different.

Lee also has a secondary mechanism (FIG. 1, elements 28, 46 and 74) having a planetary gearset (FIG. 1, elements 76, 78 and 88). Again, this second planetary gearset does not anticipate the instant invention as the secondary gearset of Lee is used as a "drive power synthesizer" as stated by Lee in col. 4, lines 34 through 38. Its purpose is to "increase the rotational power input from the continuously variable device" as detailed in col. 4, line 60 to col. 5, line 5. The literature in this art field commonly refers to this as a differential mechanism, one that takes two rotational velocities as inputs and outputs one rotational velocity. In essence, it combines two power streams into one.

More specifically, Lees patent describes how such a power flow functions. It states that power is transmitted by either the low/high speed selector (28) into the carrier of the second planetary gearset. A second power stream is transmitted via the continuously variable device (46A) to the ring gear of the second planetary gearset 76. Finally, the sun gear (88) of the second planetary gearset acts as the output of the second planetary gearset and drives the output gear 92. Such actions is described on col. 5, lines 28 through 39 in Lee. In no fashion, is the second planetary gearset used to vary the input/output speed ratio of the transmission. Its use is strictly as that of a "drive power synthesizer".

This operation is fundamentally different from the mechanism of the instant invention which acts like a "secondary planetary gearset" which phrase is used to reflect the motion and relationships held by the components of this mechanism. I.e., as the followers move around the cam, they do so in a planetary fashion in which their motion is comprised of both rotation about the carrier axis as well as a rotation about their own axis of rotation. This motion, though not decidedly uniform, but is rather oscillatory as described herein. By adjusting the position of the followers along the cam, the magnitude of these oscillations can be varied which varies the speed of the transmission output with respect to the input. Therefore, the purpose of this second mechanism is to actually alter the transmission ratio whereas the second planetary gearset of Lee is only to recombine power flows through the transmission. All gear changing mechanisms are contained within the continuously variable unit (46) and not part of the second planetary gearset as disclosed herein.

The first carrier of Lee, element 24, of the first planetary gearset has a rotational axis. This carrier is part of the first planetary gearset and serves as the output for the forward/reverse controller 8. It function necessitates that it have a rotational axis so that rotational power can be transmitted through it. Such an arrangement is obvious. But, the Lee arrangement has two planet gears (20,22) connected in series rather than parallel so that it has a fundamentally different physical form than the instant invention. Within the transmission, this first carrier (24) of Lee is used as only an intermediate output, NOT the final output. The carrier 24 of Lee also rotates in two directions depending on the crutches (14,16).

The first carrier only also rotates at two distinct speeds with respect to the first planetary gearset input, the sun gear 10. This is different from the instant invention as described herein in that the carrier of the instant inv, serving the ention can only rotate in one direction, has planet gears only mounted in parallel with the sun gear, can rotate at continuously variable velocities and serves as the final output of the transmission. These four points distinguish it from the Lee disclosed mechanism.

The first carrier of the first planetary gearset of Lee is functionally different from the instant invention in part because of two pinion gears connected in series such that one pinion gear meshes with the sun gear (10) and the second pinion gear (22) while the second pinion gear (22) meshes with the first pinion gear (20) and the ring gear (12) as described by Lee in col. 3, lines 31 through 35. This arrangement is shown in FIGS. 1 and 2. The two pinion gears (20 and 22) are arranged in such a manner as to allow the forward/reverse controller to rotate the carrier of the first planetary gearset in both a forward and reverse direction as described by Lee. This is accomplished through the use of two clutches 14 and 16. It is obvious that when clutch 14 is engaged and clutch 16 disengaged that the input of sun gear of the first planetary gearset 14 will rotate with the ring gear of the first planetary gearset 12. Under these conditions, both first and second pinion gears will not rotate on their respective rotational axis. Instead, the unit comprised of the sun gear 10, carrier 24 and ring gear 12 will rotate as a unit. This is common in the transmission art. When clutch 14 is disengaged and clutch 16 is engaged, the ring gear will be connected to the transmission housing 18 through clutch 16. The input sun gear 10 will no longer be connected to the ring gear 12 through the clutch 14. It is obvious that the first planetary gearset comprised of the sun gear 10, carrier 24, pinion gears 20 and 22 and ring gear 12 will now function as a reversing unit serving the purpose of a "forward/reverse" controller. In this mode, the sun gear will rotate in one direction, while the two pinion gears will cause the first carrier 24 to rotate in the opposite direction of the rotation on the sun gear 10. Such an arrangement and its resulting function are described in numerous mechanisms textbooks such as "Theory of Machines and Mechanisms", Uiker et al, $3^{rd}$ Ed., University Press, New York N.Y., 2003. In this way clutches 14 and 16 can control the rotational direction of the output carrier 24 of the first planetary gearset of the forward/reverse controller 8.

The ability of the carrier 24 to both rotate in both the forward and reverse directions with respect to the input sun 10 functionality is only possible with two pinion gears arranged in series. If only one pinion gear been present as opposed to two, such a reversing action would not be possible. Similarly, if the two pinion gears been arranged in parallel, such that both were connected to the ring gear 12 and sun gear 10, the ability to reverse the direction of the carrier 24 with respect to the sun gear 10 would not be possible. Therefore, the physical representation of the carrier is fundamentally different than the carrier of the instant invention as it must allow for the mounting of two pinion gears in parallel. Such an arrangement is not possible with the carrier described herein.

While the carrier 24 does have a rotational axis just as the carrier described herein, its function is different within the transmission. Specifically the carrier is used only as an intermediate output of only one of the subsystems of the entire transmission. Lee claims that the carrier is the output of only the forward/reverse controller and not the entire transmission as stated in col 3, lines 34 to 36. Furthermore, this carrier is connected to the input of the continuously variable device 46 as well as the low/high speed selector 28. This is set forth in col 3, lines 34 and 35 as well on in lines 57 to 60. The instant invention is different in that the carrier of the first planetary gearset is the "output of said transmission". Specifically it is the final output to the transmission, capable of driving auxiliary devices attached to the transmission at continuously variable rotational velocities. Therefore, just because both Lee and the instant invention have a rotational axis, the systems are very different.

The first carrier 24 of the first planetary gearset of Lee rotates in two directions. This functionality is necessitated by its use as a forward/reverse controller. In order to allow the transmission to drive the output in both directions, it is necessary for the first carrier 24 to rotate in two directions. Its direction is controlled by two clutches, 14 and 16. When clutch 14 is engaged and clutch 16 is disengaged, the carrier rotates in the same direction and at the same velocity as the input sun gear 10 of the first planetary gearset. When clutch 16 is engaged and clutch 14 is disengaged, the sun gear 10 will rotate in one direction while the two pinion gears will cause the carrier 24 to reverse direction and rotate in the opposite direction as sun gear 10. On the contrary, the instant invention carrier rotates in only one direction. Therefore, the fact that Lee discloses a continuously variable transmission having a first carrier is not anticipatory of this invention P The first carrier 24 of the first planetary gearset of Lee only rotates at two distinct speecs in relation to the input sun gear 10. When clutch 14 is engaged and clutch 16 is disengaged, the carrier rotates with the same velocity as the input sun gear 10 of the first planetary gearset. When clutch 16 is engaged and clutch 14 disengaged the carrier 24 will rotate in the opposite direction as sun gear 10 and with an absolute velocity lower than sun gear 10. Therefore the first carrier 24 of Lee's patent can only rotate at two relative velocities to the input sun gear 10 which is obvious. The instant invention is totally different and not obvious as the carrier herein can rotate at continuously variable speeds with respect to the sun gear as described in the claims. This functionality arises from the ability to move the followers along the length of the cam. By repositioning the followers along the length of the cam the particular profile of the cam (one of many) on which the followers move can be varied. This varies the magnitude of the followers oscillations. These oscillations then pass through the indexing clutches and produces a relative motion between the carrier and the sun gear. It is clear that the carrier can rotate at continuously variable velocities in relation to the sun gear. Therefore, although both Lee's patent and this application disclose carriers with rotational axis, the fact that the first carrier described by Lee rotates at only two velocities and the carrier disclosed herein rotates at continuously variable velocities with respect to their respective sun gears.

In conclusion it is shown that the invention as described herein is different from Lee in both form and function. Firstly since it has two planet gears 20, 22 connected in series rather than in parallel it has a fundamentally different physical form that that herein. Within the transmission this first carrier 24 is used only and intermediate output, not the final output. The first carrier of Lee 24 also rotates in two directions depending on the clutches 14 and 16. The first carrier also only rotates at two distinct speeds with respect to the first planetary gearset input, the sun gear 10.

While Lee has a first planetary gearset that provides uniform rotary input to the transmission and a first carrier at the output, the first planetary gearset is different from that disclosed herein. It is used as a "forward/reverse" controller as stated by lee in col. 2, line 5, and col. 3, lines 21 to 36. The purpose of this forward/reverse controller is to enable the transmission of Lee to facilitate the final output of this transmission to rotate both forward s and backwards. The first planetary gear provides a uniform rotary input to drive the transmission. Again, the carrier disclosed by Lee is different from the instant invention. Specifically the first carrier is only an intermediate output of one of the subsystems of the entire transmission. Lees patent claims that the carrier is the output of only the controller, FIG. 1, element 8, and not the entire transmission as stated in col 3, lines 34 to 36. Furthermore, the carrier is connected to the input of the continuously variable device 46 as well as the low/high speed selector 28. This is stated in Lee. On the contrary, the instant invention shows the carrier of the first planetary gearset is the "output of the transmission". Specifically, it is the final output to the transmission, capable of driving auxiliary devices attached thereto at continuously variable rotational velocities.

While Lee shows a planetary gearset including sun gear 10 and two planetary gears 20 and 22 those gears are not arranged in the manner as those of the instant invention (103, 105). The Lee gears are arranged in series between sun gear 10 and ring gear 12 so that only planet gear 20 is in contact with the sun gear 10 and only the planet gear 22 is in contact with the ring gear 12. The gears of the instant invention are arranged in parallel such that each individual planet gear meshes with the sun gear 104.

Thus is it seen that he function of Lee and the instant transmission are different. The carrier herein only operates in one direction as seen in Appendix A due to the parallel location of the planet gears.

The two pulleys shown by Lee are not cams as shown herein. Lee states so in col. 5, lines 11 to 20. Lee's pulleys 48 and 50 effects gearless shifting by changing the relative diameters between the two pulleys. Claim 2 of Lee says the same thing. This is totally different from the mechanism described and claimed herein. As described by Lee the output is varied "according to the relation in the diameters of the drive and driven pulleys 48 and 50 such that when the diameter of the drive pulley 48 is identical to that of the driven pulley 50, a 1:1 shift ratio is achieved; when the diameter of the drive pulley 48 is larger than that of the driven pulley 50, increased speed is realized, and when the diameter of the drive pulley 48 is smaller than that of the driven pulley 50, a reduction in speed is realized"

The instant application on the other hand discloses a cam and follower mechanism with a number of ratcheting clutches that vary the output of the transmission. This is accomplished as follows: A rotation of the sun gear forces one of the followers down onto the cam. Since the follower cannot rotate in this direction, the sun gear rotation causes the carrier to rotate about the cam. The followers, moving around the cam with the carrier, will then oscillate as they move up and down the lobes of the cam with the help of a return spring. Since the followers are located at different positions around the cam profile their oscillations will be out of phase. Each of the planet gears, attached to a follower, will then rotate back and forth. The operation is similar to a planetary gearset where the rotation of the carrier depends upon both the sun gear and the planet gear rotations. Specifically, the relative rotation of the planet gears forces them to rotate around the sun gear in a clockwise direction. As the planet gears orbit the sun gear, they move the carrier along with them, advancing its position with respect to the sun gear. Since the carrier is the output, a non circular cam will create transmission ratios greater than unity.

The ability to vary the transmission ratio arises from the ability to move the followers along the length of the cam as described herein. By repositioning the followers along the length of the cam, the particular profile of the cam on which the followers move can be varied. This varies the magnitude of the follower's oscillations which pass through the indexing clutches and produces a relative motion between the carrier and the sun gear.

It is thus shown that the physical interactions with which the transmission disclosed in Lee varies the transmission output and is completely different from the instant invention. It should be noted that element 54 of Lee is not a cam, but rather a portion of a pulley, which is obvious from looking at it. Lee states that "drive pulley 48 includes a fixed member 54" which can be seen in FIG. 4 to be one of the two sheaves of a variable diameter pulley.

Furthermore, it is noted that element 56 is not an oscillating cam follower but rather a portion of a pulley. The moveable member 56 allows the pulley diameter to be varied which is a common way to implement variable diameter pulleys. It does not oscillate.

It is also noted that element 28 of Lee is not an indexing clutch but rather a selectable clutch. The Lee clutch is used only to select between a high and low speed pair of gears. An indexing clutch, as the term is used in the art, describes a mechanism which engages two rotating components when the speed of the driven component is less than that of the driving component and which disengages when the driven component rotates faster than the driving component.

Again, the portion of the pulley 48 is not a cam but part of a variable diameter pulley system. The two components of such a pulley, namely a movable one and a fixed one, are well known in the art. The element 48 shown by Lee is conical in shape and therefore is by nature a infinite series of circular profiles blended together.

The portion of the item 66 is not a second cam follower as shown in FIG. 4 of Lee but rather a portion of a pulley. See col. 4, lines 16,17. This member allows the effective diameter of the pulley to be varied. The gearset including members 88 and 78 are not anticipatory of the instant invention in that there is no secondary gearset herein.

Again, elements of Lee shown as 56 and 66 are not cam followers and the cam follower of the instant invention has a rotational axis which is not collinear with the rotational axis of the carrier. Note FIGS. 1a, 1b, 1c and 5 herein. The cam followers herein are mounted on the rotational axes of the two planet gears and not that of the carrier.

In short, Lee shows a fundamentally different transmission that the instant invention. Lee achieves continuously variable ratios through the use of two variable diameter pulleys as shown in FIG. 4. This is a different paradigm than those disclosed herein as they are belt type transmissions where the power is delivered in a continuously smooth manner from the pulleys to the belt. There is no oscillatory motion within the design as there is within ratcheting continuously variable type transmission as disclosed herein. The oscillatory motion is the fundamental driver of the ability to continuously shift gear ratios.

Having described the invention and its distinctive properties it will be obvious to those or ordinary skill in the art that changes and modification can be made thereto without departing from the scope of the appended claims.

What is claimed is:

1. A continuously variable transmission arranged in a housing, said transmission comprising
an input shaft receiving power from an external power source and having a sun gear rotatable therewith,
a carrier plate rotatably mounted to and positioned coaxially with said input shaft, an output gear rigidly connected to said carrier and positioned coaxially therewith, at least two planet gears arranged equidistant around and meshing with said sun gear, each planet gear being mounted to planet gear shafts through a free wheeling clutch assembly which allows said planet gears to freely rotate in a first direction with respect to said gear shaft yet prevent rotation of the planet gear in an opposite direction with respect to said planet gear shaft, wherein each planet gear is thus rotatably mounted to said carrier, a cam having a cross section elongated in an axial direction and shaped so that the cross section changes along the axial direction, said cam being positioned coaxially with said input shaft and rigidly mounted to said housing as to be unable to rotate, at least two followers positioned to be reciprocated by said cam which are mounted on each planet gear so that they are free to move linearly along the axis thereof but rotatably engaged each planet gear shaft, said cam followers each including rollers rotatably mounted on the end of each follower distal from the said planet gear shaft, and a mechanism for positioning each follower along its planet gear shaft axis while said transmission is in motion.

2. A transmission as in claim 1 in which said cam is made up of an infinite series of unique cam profiles whose shape changes continuously from a predominantly circular profile at one end to a more eccentric shape on the other end.

3. A transmission as in claim 2 in which the active portion of each cam profile that makes up the cam surface is shaped so as to produce a constant angular velocity in said follower in a direction that engages said one way clutches as said follower moves along the cam profile.

4. A transmission as in claim 3 in which said active portion of e each cam profile that produces a constant angular velocity in said follower is long enough to ensure that any one follower is reacted upon by that portion of the profile at any time.

5. A transmission as in claim 3 in which the portion of the cam profile that is not a part of the active profile is designed to return the followers to a designated angle at the start of the active profile period with a motion defined by a continuous acceleration profile.

6. A transmission as in claim 3 wherein said mechanism for positioning the followers includes a shifting mechanism for positioning the followers along said cam configured to move only those followers not on the active portion of said cam profile.

7. A transmission as in claim 3 in which all the followers are acted upon by the same profile along said cam's length when not being actively a acted upon by said shifting mechanism.

8. A transmission as in claim 2 in which said input shaft and sun gear drive said carrier around said cam, causing said cam followers to sequentially be rotated by said active cam profile of the many profiles, so as to engage said planet gear through said clutch assembly and cause said planet gear to rotate around said sun gear and advance said carrier with respect to said sun gear.

9. A transmission as in claim 1 in which the position of said cam followers along the length of said cam defines the transmission ratio between said input shaft and said output gear.

10. A transmission as in claim 1 and including a means for urging said rollers to maintain point contact with said cam as said followers move and rotate relative to said cam while in use.

11. A transmission as in claim 10 wherein said cam followers include a spherical roller, rotatably mounted on the end of the follower distal from said planet gear shaft, whose outer spherical surface is in point contact with the outer surface of said cam.

* * * * *